(12) United States Patent
Sato et al.

(10) Patent No.: US 12,179,177 B2
(45) Date of Patent: Dec. 31, 2024

(54) EXHAUST-GAS PURIFICATION CATALYST AND EXHAUST-GAS TREATMENT APPARATUS

(71) Applicant: Murata Manufacturing Co., Ltd., Nagaokakyo (JP)

(72) Inventors: Hideto Sato, Nagaokakyo (JP); Akihiro Takeuchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 689 days.

(21) Appl. No.: 17/469,246

(22) Filed: Sep. 8, 2021

(65) Prior Publication Data
US 2021/0402378 A1  Dec. 30, 2021

Related U.S. Application Data

(63) Continuation of application No. PCT/JP2020/008854, filed on Mar. 3, 2020.

(30) Foreign Application Priority Data

Mar. 22, 2019 (JP) .................................. 2019-055113

(51) Int. Cl.
| | |
|---|---|
| *B01J 23/63* | (2006.01) |
| *B01D 53/94* | (2006.01) |
| *B01J 23/00* | (2006.01) |
| *F01N 3/28* | (2006.01) |

(52) U.S. Cl.
CPC .............. *B01J 23/63* (2013.01); *B01D 53/94* (2013.01); *B01J 23/002* (2013.01); *F01N 3/2803* (2013.01); *B01D 2255/1023* (2013.01); *B01D 2255/2042* (2013.01); *B01D 2255/2061* (2013.01); *B01D 2255/20715* (2013.01); *B01D 2255/402* (2013.01); *F01N 2370/02* (2013.01)

(58) Field of Classification Search
None
See application file for complete search history.

(56) References Cited

U.S. PATENT DOCUMENTS

| | | | |
|---|---|---|---|
| 5,439,865 | A | 8/1995 | Abe et al. |
| 2009/0023580 | A1 | 1/2009 | Tanaka et al. |

FOREIGN PATENT DOCUMENTS

| | | | |
|---|---|---|---|
| CN | 101146615 A | | 3/2008 |
| CN | 102133546 A | * | 7/2011 |
| CN | 104689817 A | | 6/2015 |
| JP | H02166305 A | | 6/1990 |
| JP | H0647279 B2 | | 2/1994 |
| JP | H10277393 A | | 10/1998 |
| JP | 2007326001 A | | 12/2007 |
| JP | 2008100902 A | | 5/2008 |
| JP | 2013022558 A | | 2/2013 |
| JP | 2014046271 A | | 3/2014 |

(Continued)

OTHER PUBLICATIONS

Chen et al. CN102133546A—translated document (Year: 2011).*

(Continued)

*Primary Examiner* — Jelitza M Perez
(74) *Attorney, Agent, or Firm* — ArentFox Schiff LLP

(57) ABSTRACT

An exhaust-gas purification catalyst that contains a perovskite-type composite oxide composed of at least Ba, Zr, Y, and Pd.

20 Claims, 1 Drawing Sheet

(56) References Cited

FOREIGN PATENT DOCUMENTS

| | | | |
|---|---|---|---|
| JP | 2014200715 A | 10/2014 |
| WO | 2006095557 A1 | 9/2006 |

OTHER PUBLICATIONS

International Search Report issued for PCT/JP2020/008854, date of mailing May 19, 2020.
Written Opinion of the International Searching Authority issued for PCT/JP2020/008854, date of mailing May 19, 2020.

* cited by examiner

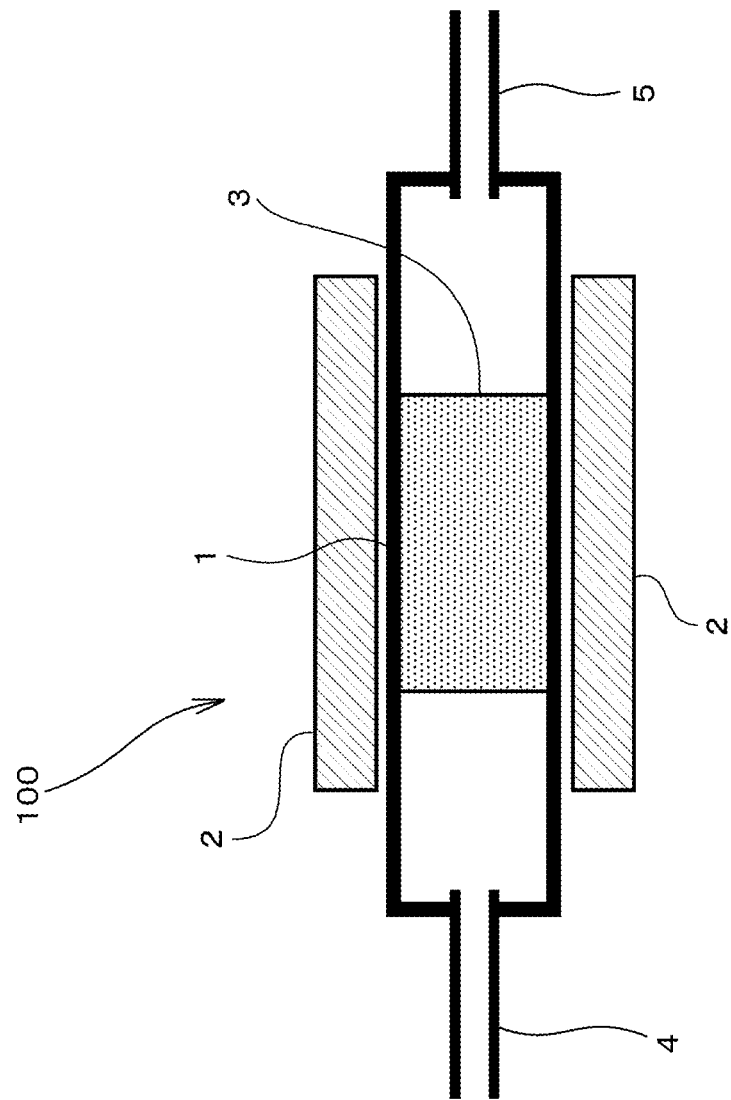

EXHAUST-GAS PURIFICATION CATALYST AND EXHAUST-GAS TREATMENT APPARATUS

CROSS REFERENCE TO RELATED APPLICATIONS

The present application is a continuation of International application No. PCT/JP2020/008854, filed Mar. 3, 2020, which claims priority to Japanese Patent Application No. 2019-055113, filed Mar. 22, 2019, the entire contents of each of which are incorporated herein by reference.

FIELD OF THE INVENTION

The present invention relates to an exhaust-gas purification catalyst and an exhaust-gas treatment apparatus.

BACKGROUND OF THE INVENTION

Exhaust gases emitted from internal combustion engines of automobiles contain components harmful to the human body, such as hydrocarbon gases. There are exhaust-gas purification catalysts known to decrease such harmful components.

In generally known exhaust-gas purification catalysts, active ingredients, such as platinum, palladium, manganese, and cobalt, are supported on ceramics, such as alumina. Noble metals, such as platinum and palladium, are expensive but can treat exhaust gases at lower temperatures than manganese and cobalt catalysts.

In catalysts with an active ingredient supported on a carrier, such as alumina, it is known that the active ingredient is finely ground and supported on the carrier to exhibit high catalytic activity. However, finer active ingredients have higher surface energy and are more likely to sinter. In particular, exhaust-gas purification catalysts are exposed to high temperature due to high-temperature exhaust gases and the heat of reaction, may sinter rapidly, and may have lower catalytic activity.

As a catalyst for preventing thermal degradation at high temperatures, Patent Document 1 describes an exhaust-gas purification catalyst in which a catalyst layer containing at least one noble metal selected from Pt, Pd, and Rh is supported on a heat-resistant inorganic monolithic carrier.

Although the exhaust-gas purification catalyst described in Patent Document 1 has the carrier with improved heat resistance, the supported noble metal is in the form of particles composed of a plurality of atoms, and it is difficult to prevent sintering of the noble metal itself.

On the other hand, Patent Document 2 describes a catalyst in which noble metal catalyst particles are incorporated into a crystal lattice of a perovskite-type composite oxide instead of being directly supported on a carrier to prevent degradation of catalytic activity while high-temperature heating. In this catalyst, noble metal catalyst particles, at least one first metal selected from the group consisting of barium, lanthanum, strontium, neodymium, and cerium, and at least one second metal selected from the group consisting of cobalt, nickel, iron, chromium, and molybdenum form a perovskite-type composite oxide.

However, Patent Document 2 only describes a structure in which the above catalyst is placed in a later stage and an ignition catalyst with noble metal catalyst particles supported on a carrier is placed in a former stage. Thus, the above catalyst is tailored to prevent degradation while high-temperature heating, and the ignition catalyst in the former stage is required for exhaust-gas purification treatment in a wide temperature range of low to high temperature.

Patent Document 3 describes an exhaust-gas purification catalyst that does not require the ignition catalyst and that is less likely to deteriorate in purification performance even while high-temperature heating. In this exhaust-gas purification catalyst, a Pd composite oxide composed of at least one selected from rare-earth metals and alkaline-earth metals and a composite oxide composed of at least one transition metal coexist in a solid solution or in a mixed state. According to Patent Document 3, even exhaust-gas purification treatment at 950° C. causes a small decrease in the activity of the exhaust-gas purification catalyst.

Patent Document 1: Japanese Unexamined Patent Application Publication No. 6-47279

Patent Document 2: Japanese Unexamined Patent Application Publication No. 2-166305

Patent Document 3: Japanese Unexamined Patent Application Publication No. 10-277393

SUMMARY OF THE INVENTION

However, exhaust-gas purification catalysts may be present in a higher temperature environment, such as at 1100° C. Thus, there is a need for an exhaust-gas purification catalyst with catalytic activity that is less likely to decrease even when exposed to high temperatures, such as 1100° C.

The present invention solves these problems and aims to provide an exhaust-gas purification catalyst and an exhaust-gas treatment apparatus that show a smaller decrease in catalytic activity even when exposed to a high temperature, such as 1100° C.

An exhaust-gas purification catalyst according to the present invention contains a perovskite-type composite oxide composed of at least Ba, Zr, Y, and Pd.

The mole ratio of Y to Ba may range from 0.05 to 0.50.
The mole ratio of Y to Ba may range from 0.05 to 0.30.
The mole ratio of Pd to Ba may range from 0.01 to 0.22.
The mole ratio of Pd to Ba may range from 0.04 to 0.22.
The mole ratio of Zr to Ba may range from 0.50 to 2.00.
The mole ratio of Zr to Ba may range from 0.50 to 1.00.

The difference in the lowest temperature at which the decomposition rate of an exhaust gas reaches 90% or more between before and after the exhaust-gas purification catalyst is heated at 1100° C. may be less than 100° C.

An exhaust-gas treatment apparatus according to the present invention includes the exhaust-gas purification catalyst.

An exhaust-gas purification catalyst according to the present invention shows a smaller decrease in catalytic activity even when exposed to a high temperature, such as 1100° C.

An exhaust-gas treatment apparatus according to the present invention, which includes the exhaust-gas purification catalyst, shows a smaller decrease in exhaust-gas purification performance even when the exhaust-gas purification catalyst is exposed to a high temperature, such as 1100° C.

BRIEF DESCRIPTION OF THE DRAWING

The FIGURE is a schematic view of an exhaust-gas treatment apparatus including an exhaust-gas purification catalyst according to the present invention.

DETAILED DESCRIPTION OF THE PREFERRED EMBODIMENTS

The features of the present invention are specifically described below in the embodiments of the present invention.

An exhaust-gas purification catalyst according to the present invention satisfies the following requirements (hereinafter referred to as the requirements of the present invention). An exhaust-gas purification catalyst according to the present invention contains a perovskite-type composite oxide composed of at least Ba, Zr, Y, and Pd.

Exhaust gases emitted from internal combustion engines of automobiles include hydrocarbon gases, sulfur compounds, nitrogen compounds, and the like. An exhaust-gas purification catalyst according to the present invention can be mainly used to purify hydrocarbon gases. The hydrocarbon gases contain a compound composed of a combination of C, H, and O, for example, an aromatic hydrocarbon, an alcohol, a ketone, an aldehyde, a carboxylic acid, and the like.

A reaction to purify hydrocarbon gases using an exhaust-gas purification catalyst according to the present invention is described with reference to a combustion reaction of ethanol, which has an emission limit in the air. The combustion reaction of ethanol is represented by the following formula (1).

$$C_2H_5OH + 3O_2 \rightarrow 3H_2O + 2CO_2 \quad (1)$$

As shown in the formula (1), the reaction between ethanol and air (oxygen) produces harmless water vapor and carbon dioxide.

The FIGURE is a schematic view of an exhaust-gas treatment apparatus 100 including an exhaust-gas purification catalyst according to an embodiment of the present invention. The exhaust-gas treatment apparatus 100 includes a pipe 1 through which a gas to be treated flows, a heater 2 for heating the gas to be treated flowing through the pipe 1, and an exhaust-gas purification catalyst 3 inside the pipe 1 at a position in contact with the gas to be treated. The exhaust-gas purification catalyst 3 is an exhaust-gas purification catalyst according to the present invention.

A gas supply pipe 4 for supplying the gas to be treated to the pipe 1 is coupled to the pipe 1 on the upstream side. A gas discharge pipe 5 for discharging the gas after purification is coupled to the pipe 1 on the downstream side.

The exhaust-gas purification catalyst may have any shape. For example, the exhaust-gas purification catalyst may be a pelleted catalyst formed by processing a catalyst material into grains with a size of several millimeters to several centimeters, a honeycomb catalyst formed by processing a catalyst material into a honeycomb shape, or a honeycomb coated catalyst formed by coating the surface of a honeycomb ceramic with the catalyst.

Example 1

BaCO$_3$, ZrO$_2$, Y$_2$O$_3$, and PdO were prepared as materials for an exhaust-gas purification catalyst, were weighed at a mole ratio of Ba:Zr:Y:Pd=1.00:0.80:0.20:0.01, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 1.

The exhaust-gas purification catalyst according to Example 1 and exhaust-gas purification catalysts according to Examples 2 to 11 described later satisfy the requirements of the present invention.

Example 2

BaCO$_3$, ZrO$_2$, Y$_2$O$_3$, and PdO were prepared as materials for an exhaust-gas purification catalyst, were weighed at a mole ratio of Ba:Zr:Y:Pd=1.00:0.80:0.20:0.02, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 2.

Example 3

BaCO$_3$, ZrO$_2$, Y$_2$O$_3$, and PdO were prepared as materials for an exhaust-gas purification catalyst, were weighed at a mole ratio of Ba:Zr:Y:Pd=1.00:0.80:0.20:0.04, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 3.

Example 4

BaCO$_3$, ZrO$_2$, Y$_2$O$_3$, and PdO were prepared as materials for an exhaust-gas purification catalyst, were weighed at a mole ratio of Ba:Zr:Y:Pd=1.00:0.80:0.20:0.09, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 4.

Example 5

BaCO$_3$, ZrO$_2$, Y$_2$O$_3$, and PdO were prepared as materials for an exhaust-gas purification catalyst, were weighed at a mole ratio of Ba:Zr:Y:Pd=1.00:0.80:0.20:0.22, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 5.

Example 6

BaCO$_3$, ZrO$_2$, Y$_2$O$_3$, and PdO were prepared as materials for an exhaust-gas purification catalyst, were weighed at a mole ratio of Ba:Zr:Y:Pd=1.00:0.95:0.05:0.09, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 6.

Example 7

BaCO$_3$, ZrO$_2$, Y$_2$O$_3$, and PdO were prepared as materials for an exhaust-gas purification catalyst, were weighed at a mole ratio of Ba:Zr:Y:Pd=1.00:0.90:0.10:0.09, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 7.

Example 8

$BaCO_3$, $ZrO_2$, $Y_2O_3$, and PdO were prepared as materials for an exhaust-gas purification catalyst, were weighed at a mole ratio of Ba:Zr:Y:Pd=1.00:0.70:0.30:0.09, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 8.

Example 9

$BaCO_3$, $ZrO_2$, $Y_2O_3$, and PdO were prepared as materials for an exhaust-gas purification catalyst, were weighed at a mole ratio of Ba:Zr:Y:Pd=1.00:0.50:0.50:0.09, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 9.

Example 10

$BaCO_3$, $ZrO_2$, $Y_2O_3$, and PdO were prepared as materials for an exhaust-gas purification catalyst, were weighed at a mole ratio of Ba:Zr:Y:Pd=1.00:1.50:0.20:0.09, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 10.

Example 11

$BaCO_3$, $ZrO_2$, $Y_2O_3$, and PdO were prepared as materials for an exhaust-gas purification catalyst, were weighed at a mole ratio of Ba:Zr:Y:Pd=1.00:2.00:0.20:0.09, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Example 11.

The following exhaust-gas purification catalysts according to Comparative Examples 1 to 5 were prepared for comparison with the exhaust-gas purification catalysts according to Examples 1 to 11. The exhaust-gas purification catalysts according to Comparative Examples 1 to 5 do not contain Y and do not satisfy the requirements of the present invention.

Comparative Example 1

$BaCO_3$, $ZrO_2$, and PdO were prepared as materials for an exhaust-gas purification catalyst, were weighed at a mole ratio of Ba:Zr:Pd=1.00:1.00:0.01, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Comparative Example 1.

Comparative Example 2

$BaCO_3$, $ZrO_2$, and PdO were prepared as materials for an exhaust-gas purification catalyst, were weighed at a mole ratio of Ba:Zr:Pd=1.00:1.00:0.02, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Comparative Example 2.

Comparative Example 3

$BaCO_3$, $ZrO_2$, and PdO were prepared as materials for an exhaust-gas purification catalyst, were weighed at a mole ratio of Ba:Zr:Pd=1.00:1.00:0.09, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Comparative Example 3.

Comparative Example 4

$BaCO_3$, $ZrO_2$, and PdO were prepared as materials for an exhaust-gas purification catalyst, were weighed at a mole ratio of Ba:Zr:Pd=1.00:1.00:0.22, and were wet-mixed with cobblestones, water, and a binder to prepare a mixture. The mixture was dried in an oven at a temperature of 120° C. and was then ground and classified to form grains with a size of 1.5 to 2.5 mm. The granular sample was then fired in the air at 1000° C. for 1 hour to form an exhaust-gas purification catalyst according to Comparative Example 4.

Comparative Example 5

A $\gamma$-$Al_2O_3$ powder carrier was impregnated with aqueous Pd chloride such that the amount of Pd was 3% by weight, and was then heat-treated in the air at 600° C. for 1 hour. The heat-treated powder was pressed into pellets and was then ground and classified to form grains with a size of 1.5 to 2.5 mm. Thus, an exhaust-gas purification catalyst according to Comparative Example 5 was prepared.

<Identification of Crystal Phase>

The exhaust-gas purification catalysts according to Examples 1 to 11 and Comparative Examples 1 to 5 were ground in a mortar and were checked for a crystal phase by powder XRD measurement. Cu-K$\alpha$1 was used as an X-ray in the powder XRD measurement.

Table 1 shows crystal phases and compositions identified in the exhaust-gas purification catalysts according to Examples 1 to 11 and Comparative Examples 1 to 5.

TABLE 1

| Exhaust-gas purification catalyst | Crystal phase | Mole ratio | | | |
|---|---|---|---|---|---|
| | | Ba | Zr | Y | Pd |
| Example 1 | Perovskite | 1.00 | 0.80 | 0.20 | 0.01 |
| Example 2 | Perovskite | 1.00 | 0.80 | 0.20 | 0.02 |
| Example 3 | Perovskite | 1.00 | 0.80 | 0.20 | 0.04 |
| Example 4 | Perovskite | 1.00 | 0.80 | 0.20 | 0.09 |
| Example 5 | Perovskite | 1.00 | 0.80 | 0.20 | 0.22 |
| Example 6 | Perovskite | 1.00 | 0.95 | 0.05 | 0.09 |
| Example 7 | Perovskite | 1.00 | 0.90 | 0.10 | 0.09 |
| Example 8 | Perovskite, $BaCO_3$, $Y_2O_3$ | 1.00 | 0.70 | 0.30 | 0.09 |
| Example 9 | Perovskite, $BaCO_3$, $Y_2O_3$ | 1.00 | 0.50 | 0.50 | 0.09 |
| Example 10 | Perovskite, $ZrO_2$ | 1.00 | 1.50 | 0.20 | 0.09 |
| Example 11 | Perovskite, $ZrO_2$ | 1.00 | 2.00 | 0.20 | 0.09 |
| Comparative example 1 | Perovskite, PdO | 1.00 | 1.00 | — | 0.01 |
| Comparative example 2 | Perovskite, PdO | 1.00 | 1.00 | — | 0.02 |
| Comparative example 3 | Perovskite, PdO | 1.00 | 1.00 | — | 0.09 |
| Comparative example 4 | Perovskite, PdO | 1.00 | 1.00 | — | 0.22 |
| Comparative example 5 | $Al_2O_3$, PdO | — | — | — | — |

In all the exhaust-gas purification catalysts according to Examples 1 to 11, a crystal phase with a perovskite structure was identified, and a heterophase of $BaCO_3$, $Y_2O_3$, $ZrO_2$, or the like was also identified depending on the component ratio.

Although all the exhaust-gas purification catalysts according to Examples 1 to 11 contained Pd, no diffraction line attributable to palladium oxide or metal palladium was observed. Thus, Pd together with Ba, Zr, and Y constitutes a perovskite-type composite oxide. More specifically, the perovskite-type composite oxide is represented by the general formula $A_xB_yO_z$, wherein A denotes Ba, B denotes Zr, Y and Pd, and O denotes oxygen.

On the other hand, in the exhaust-gas purification catalysts according to Comparative Examples 1 to 5, PdO was detected as a crystal phase. Thus, in the exhaust-gas purification catalysts according to Comparative Examples 1 to 5, Pd does not react with the perovskite-type composite oxide or alumina.

The results of Examples 1 to 11 and Comparative Examples 1 to 5 show that only using Ba, Zr, and Pd as materials cannot produce a perovskite-type composite oxide containing Pd as a constituent element, and Y is further required.

The specific surface areas of the exhaust-gas purification catalysts according to Examples 1 to 11 were determined to be in the range of 6 to 14 $m^2/g$ by a BET one-point method.

<Evaluation of Catalytic Activity>

The exhaust-gas purification catalysts according to Examples 1 to 11 and Comparative Examples 1 to 5 were ground and classified to a size of 0.5 to 0.7 mm. A combustion reaction of ethanol was then performed by the following method.

The pipe 1 of the exhaust-gas treatment apparatus 100 in the FIGURE was filled with 0.3 cc of an exhaust-gas purification catalyst produced by the above method and was heated to a predetermined temperature with the heater 2. Air containing 0.5% by volume of ethanol was then introduced through the gas supply pipe 4 at a flow rate of 500 cc/min. The gas hourly space velocity (GHSV) corresponded to 100,000/h.

Ethanol is introduced into the pipe 1, and water vapor and carbon dioxide are produced by the combustion reaction. A gas discharged from the gas discharge pipe 5 after the combustion reaction was collected, and the ethanol concentration was measured with a gas analyzer (gas chromatograph). The ethanol decomposition rate was determined from the ethanol concentrations before and after the combustion reaction. The exhaust-gas purification catalyst was heated with the heater 2 to 200° C. or more at intervals of 100° C., and the ethanol decomposition rate was determined at each temperature. The temperature at which the ethanol decomposition rate reached 90% or more was determined. This temperature is the lowest temperature at which the ethanol decomposition rate reaches 90% or more. The upper limit of the heating temperature was 600° C.

<Evaluation of Catalyst Heat Resistance>

To examine heat resistance, each of the exhaust-gas purification catalysts according to Examples 1 to 11 and Comparative Examples 1 to 5 was heated to 1100° C. in the air and was maintained for 10 hours. The ethanol decomposition rate of the exhaust-gas purification catalyst was then determined after cooling in the same manner as in the evaluation of catalytic activity. As described above, the exhaust-gas purification catalyst was heated with the heater 2 to 200° C. or more at intervals of 100° C., and the ethanol decomposition rate was determined at each temperature. The temperature at which the ethanol decomposition rate reached 90% or more (the lowest temperature) was determined.

Table 2 shows the results of the evaluation of catalytic activity and the evaluation of catalyst heat resistance of the exhaust-gas purification catalysts according to Examples 1 to 11 and Comparative Examples 1 to 5.

TABLE 2

| | Lowest temperature at which ethanol decomposition rate reaches 90% or more | |
|---|---|---|
| Exhaust-gas purification catalyst | Evaluation of catalytic activity | Evaluation of catalyst heat resistance |
| Example 1 | 300° C. | 300° C. |
| Example 2 | 300° C. | 300° C. |
| Example 3 | 200° C. or less | 200° C. or less |
| Example 4 | 200° C. or less | 200° C. or less |
| Example 5 | 200° C. or less | 200° C. or less |
| Example 6 | 200° C. or less | 200° C. or less |
| Example 7 | 200° C. or less | 200° C. or less |
| Example 8 | 200° C. or less | 200° C. or less |
| Example 9 | 200° C. or less | 200° C. or less |
| Example 10 | 200° C. or less | 200° C. or less |
| Example 11 | 200° C. or less | 200° C. or less |
| Comparative example 1 | 400° C. | 500° C. |
| Comparative example 2 | 400° C. | 500° C. |
| Comparative example 3 | 300° C. | 400° C. |
| Comparative example 4 | 200° C. or less | 400° C. |
| Comparative example 5 | 200° C. or less | 500° C. |

The lowest temperature at which the ethanol decomposition rate reached 90% or more described as "200° C. or less" in Table 2 means that the ethanol decomposition rate had already reached 90% or more at 200° C., and the lowest temperature at which the ethanol decomposition rate reached actually 90% or more was 200° C. or less.

Table 2 shows that in the evaluation of catalytic activity before the exhaust-gas purification catalyst was heated at 1100° C., the lowest temperature at which the ethanol decomposition rate reached 90% or more was 300° C. or less in all of Examples 1 to 11 but was 400° C. or less in Comparative Examples 1 to 5.

The exhaust-gas purification catalysts according to Example 1 and Comparative Example 1, Example 2 and Comparative Example 2, Example 4 and Comparative Example 3, and Example 5 and Comparative Example 4 have the same Pd content. Comparing the results of these exhaust-gas purification catalysts with the same Pd content, the temperature at which the ethanol decomposition rate reached 90% was lower in the exhaust-gas purification catalysts according to the examples than the exhaust-gas purification catalysts according to the comparative examples. This is probably because the exhaust-gas purification catalysts according to the examples contained Pd as a constituent element of the perovskite-type composite oxide and therefore had a high degree of dispersion of Pd and a large number of catalytic active sites. Thus, the exhaust-gas purification catalysts according to the examples had a high ethanol decomposition rate at a lower temperature than the exhaust-gas purification catalysts according to the comparative examples, in which Pd was not a constituent element of the perovskite-type composite oxide.

The exhaust-gas purification catalyst according to Comparative Example 5, in which the alumina carrier itself was fine particles, had the same catalytic activity as the examples.

Table 2 also shows that in the evaluation of catalyst heat resistance, all the exhaust-gas purification catalysts according to Examples 1 to 11 heated at 1100° C. had the same lowest temperature at which the ethanol decomposition rate reached 90% or more as before heated at 1100° C. Because the heating temperature was changed at intervals of 100° C., to be exact, the difference in the lowest temperature at which the ethanol decomposition rate reached 90% or more between before and after heating at 1100° C. is less than 100° C.

Thus, an exhaust-gas purification catalyst according to the present invention has high heat resistance and can show a smaller decrease in catalytic activity even when heated at a high temperature of 1100° C. Thus, an exhaust-gas purification catalyst according to the present invention can show a smaller decrease in catalytic activity and can effectively perform exhaust-gas purification treatment in the temperature range of at least 200° C. to 1100° C.

As described above, the exhaust-gas purification catalysts according to Examples 1 to 11 contained Pd as a constituent element of the perovskite-type composite oxide and therefore had a high degree of dispersion of Pd and a large number of catalytic active sites. Furthermore, Pd as a constituent element of the perovskite-type composite oxide is less likely to sinter. Thus, heating at 1100° C. is less likely to decrease the catalytic activity of the exhaust-gas purification catalysts according to Examples 1 to 11.

By contrast, the lowest temperature at which the ethanol decomposition rate reached 90% or more in the exhaust-gas purification catalysts according to Comparative Examples 1 to 5 was higher after heating at 1100° C. than before heating at 1100° C. This is because, in the exhaust-gas purification catalysts according to Comparative Examples 1 to 5, in which Pd was not a constituent element of the perovskite-type composite oxide, heating at 1100° C. causes Pd to sinter, decreases the number of Pd atoms exposed on the surface, and decreases the number of catalytic active sites. In particular, in the exhaust-gas purification catalyst of Comparative Example 5, heating at 1100° C. increased the lowest temperature at which the ethanol decomposition rate reached 90% or more by 300° C. or more from 200° C. or less to 500° C.

Thus, heating at a high temperature of 1100° C. causes thermal degradation and decreases catalytic activity of the exhaust-gas purification catalysts that do not satisfy the requirements of the present invention.

Even when Pd is a constituent element of the perovskite-type composite oxide, a perovskite-type composite oxide with low heat resistance sinters by itself and decreases catalytic activity. In an exhaust-gas purification catalyst according to the present invention, at least Ba, Zr, Y, and Pd constitute a perovskite-type composite oxide, and the perovskite-type composite oxide itself has high heat resistance. Thus, an exhaust-gas purification catalyst according to the present invention shows a smaller decrease in catalytic activity even when heated at a high temperature of 1100° C.

As shown in Table 1, the mole ratio of Y to Ba ranges from 0.05 to 0.50. As can be seen from the crystal phases and compositions of Examples 6 to 9 in Table 1, when the Y content is increased and the Zr content is decreased, a mole ratio of Y to Ba of 0.3 or more results in the presence of Y that is not incorporated into the perovskite-type composite oxide and a decrease in active ingredient. Thus, the mole ratio of Y to Ba preferably ranges from 0.05 to 0.30.

As shown in Table 1, the mole ratio of Pd to Ba ranges from 0.01 to 0.22. As shown in Table 2, in the exhaust-gas purification catalysts according to Examples 1 and 2 with a mole ratio of Pd to Ba of less than 0.04, the lowest temperature at which the ethanol decomposition rate reached 90% or more was 300° C. in the evaluation of catalyst heat resistance. On the other hand, in the exhaust-gas purification catalysts according to Examples 3 to 11 with a mole ratio of Pd to Ba of 0.04 or more, the lowest temperature at which the ethanol decomposition rate reached 90% or more was 200° C. or less. Thus, the mole ratio of Pd to Ba preferably ranges from 0.04 to 0.22.

As shown in Table 1, the mole ratio of Zr to Ba ranges from 0.50 to 2.00. As can be seen from the crystal phases and compositions of Examples 10 and 11 in Table 1, a mole ratio of Zr to Ba of more than 1.00 results in the presence of Zr that is not incorporated into the perovskite-type composite oxide and a decrease in active ingredient. Thus, the mole ratio of Zr to Ba preferably ranges from 0.50 to 1.00.

The present invention is not limited to these embodiments, and various applications and modifications can be made within the scope of the present invention.

For example, although the combustion reaction of ethanol is described above as an example of a reaction for purifying a hydrocarbon gas with an exhaust-gas purification catalyst according to the present invention, the hydrocarbon gas is not limited to ethanol. Furthermore, the gas to be treated is not limited to a hydrocarbon gas. However, as described above, a hydrocarbon gas can be effectively removed with an exhaust-gas purification catalyst according to the present invention, and therefore the gas to be treated preferably contains a hydrocarbon gas.

The exhaust-gas purification catalysts according to Examples 1 to 11 contain a perovskite-type composite oxide composed of Ba, Zr, Y, and Pd. However, the constituent elements of the perovskite-type composite oxide are not limited to Ba, Zr, Y, and Pd and may further include another element, provided that a decrease in catalytic activity can be reduced even when exposed to a high temperature, such as 1100° C.

REFERENCE SIGNS LIST 1 pipe
2 heater
3 exhaust-gas purification catalyst
4 gas supply pipe
5 gas discharge pipe
100 exhaust-gas treatment apparatus

The invention claimed is:

1. An exhaust-gas purification catalyst comprising a perovskite-type composite oxide consisting essentially of Ba, Zr, Y, and Pd.

2. The exhaust-gas purification catalyst according to claim 1, wherein a mole ratio of Y to Ba ranges from 0.05 to 0.50.

3. The exhaust-gas purification catalyst according to claim 2, wherein the mole ratio of Y to Ba ranges from 0.05 to 0.30.

4. The exhaust-gas purification catalyst according to claim 1, wherein a mole ratio of Pd to Ba ranges from 0.01 to 0.22.

5. The exhaust-gas purification catalyst according to claim 4, wherein the mole ratio of Pd to Ba ranges from 0.04 to 0.22.

6. The exhaust-gas purification catalyst according to claim 1, wherein a mole ratio of Zr to Ba ranges from 0.50 to 2.00.

7. The exhaust-gas purification catalyst according to claim 6, wherein the mole ratio of Zr to Ba ranges from 0.50 to 1.00.

8. The exhaust-gas purification catalyst according to claim 1, wherein:
a mole ratio of Y to Ba ranges from 0.05 to 0.50,
a mole ratio of Pd to Ba ranges from 0.01 to 0.22, and
a mole ratio of Zr to Ba ranges from 0.50 to 2.00.

9. The exhaust-gas purification catalyst according to claim 8, wherein the mole ratio of Y to Ba ranges from 0.05 to 0.30.

10. The exhaust-gas purification catalyst according to claim 8, wherein the mole ratio of Pd to Ba ranges from 0.04 to 0.22.

11. The exhaust-gas purification catalyst according to claim 8, wherein the mole ratio of Zr to Ba ranges from 0.50 to 1.00.

12. The exhaust-gas purification catalyst according to claim 8, wherein
the mole ratio of Y to Ba ranges from 0.05 to 0.30,
the mole ratio of Pd to Ba ranges from 0.04 to 0.22, and
the mole ratio of Zr to Ba ranges from 0.70 to 0.95.

13. The exhaust-gas purification catalyst according to claim 1, wherein a difference in a lowest temperature at which a decomposition rate of an exhaust gas reaches 90% or more between before and after the exhaust-gas purification catalyst is heated at 1100° C. is less than 100° C.

14. An exhaust-gas treatment apparatus comprising:
a pipe through which a gas to be treated can flow; and
the exhaust-gas purification catalyst according to claim 1 inside the pipe and at a position to contact the gas to be treated.

15. The exhaust-gas treatment apparatus according to claim 14, wherein a mole ratio of Y to Ba ranges from 0.05 to 0.50.

16. The exhaust-gas treatment apparatus according to claim 15, wherein the mole ratio of Y to Ba ranges from 0.05 to 0.30.

17. The exhaust-gas treatment apparatus according to claim 14, wherein a mole ratio of Pd to Ba ranges from 0.01 to 0.22.

18. The exhaust-gas treatment apparatus according to claim 17, wherein the mole ratio of Pd to Ba ranges from 0.04 to 0.22.

19. The exhaust-gas treatment apparatus according to claim 14, wherein a mole ratio of Zr to Ba ranges from 0.50 to 2.00.

20. The exhaust-gas treatment apparatus according to claim 14, wherein:
a mole ratio of Y to Ba ranges from 0.05 to 0.50,
a mole ratio of Pd to Ba ranges from 0.01 to 0.22, and
a mole ratio of Zr to Ba ranges from 0.50 to 2.00.

* * * * *